Figure 4:
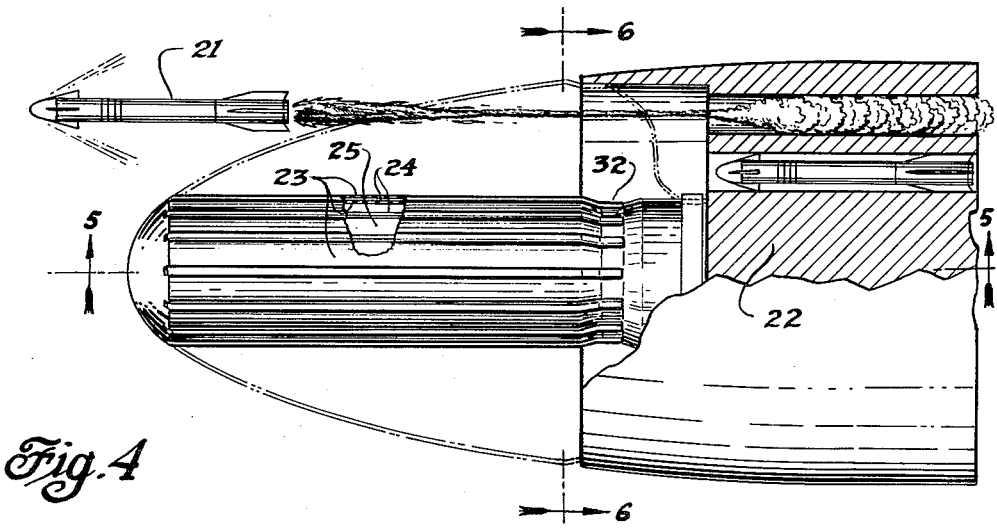

Sept. 11, 1962 R. L. COX, JR 3,053,488
INFLATABLE STREAMLINED ENCLOSURE
Filed May 29, 1959 2 Sheets-Sheet 1
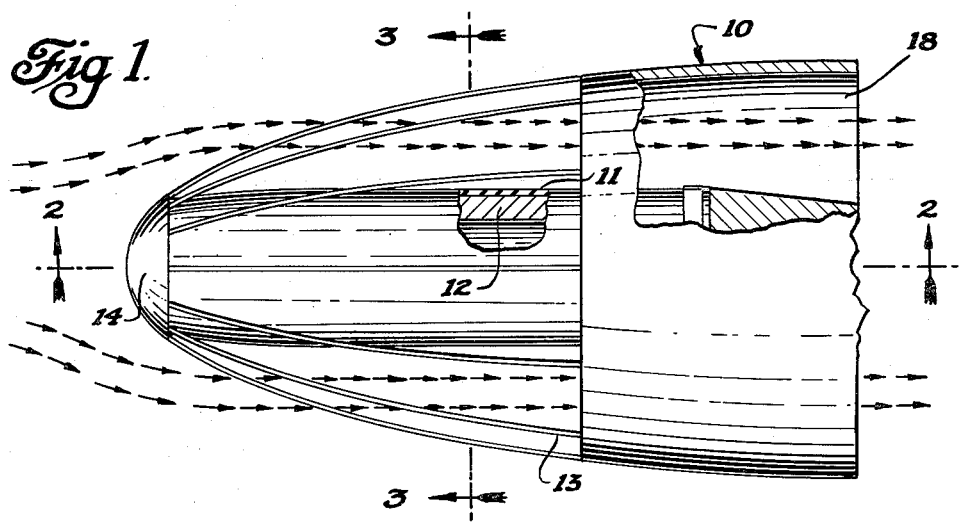
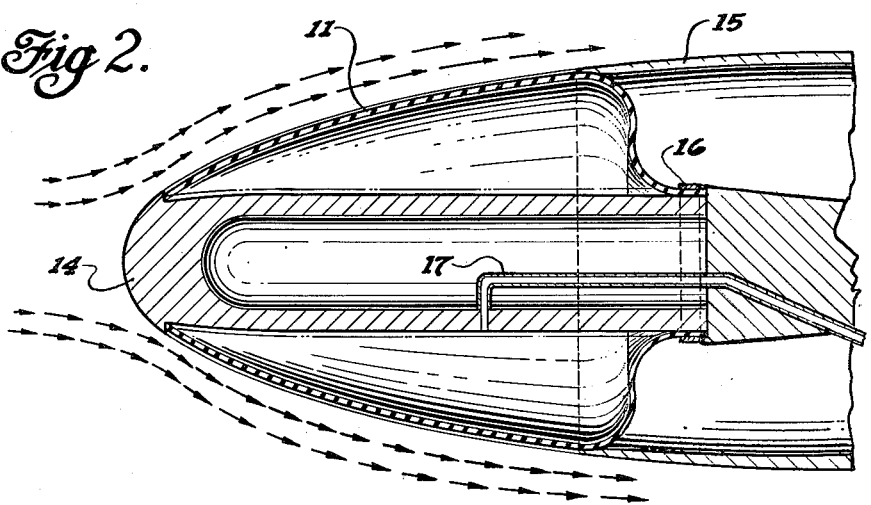
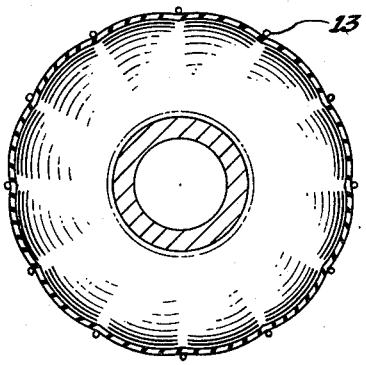
INVENTOR.
ROBERT L. COX, JR.
BY
Julian C. Renfro
ATTORNEY Sept. 11, 1962   R. L. COX, JR   3,053,488
INFLATABLE STREAMLINED ENCLOSURE
Filed May 29, 1959   2 Sheets-Sheet 2

INVENTOR.
ROBERT L. COX, JR.
BY
ATTORNEY.

United States Patent Office 3,053,488
Patented Sept. 11, 1962

3,053,488
INFLATABLE STREAMLINED ENCLOSURE
Robert L. Cox, Jr., Baldwin, Md., assignor to Martin-Marietta Corporation, a corporation of Maryland
Filed May 29, 1959, Ser. No. 816,758
4 Claims. (Cl. 244—130)

This invention relates to an arrangement for shutting off large, relatively low pressure fluid flows, and more particularly to an inflatable member adapted to be mounted at the front end of a rocket pod or jet engine of an aircraft and capable of being selectively inflated so as to streamline the pod, or the nacelle of a shutdown engine so as to minimize drag and to prevent the undesired entry of ram air.

In the aircraft art, it is well known to use devices such as mechanical shutter doors to prevent undesired entry of ram air into the inlet of a jet engine that is not being operated. Although such doors are intended to bring about the smooth flow of air about and over the nacelle, these closures have often been comparatively crude aerodynamically insofar as achieving a streamlined shape, and furthermore have been very undependable under low temperature operating conditions due to the tendency thereof to freeze in one fixed position.

Frangible nose cones have been employed for streamlining rocket pods, with the nose cone being disintegrated by the impact of first firing. However, no streamlining of the rocket pod is then afforded for the return flight, and a considerable amount of additional fuel is required due to this drag increase unless the rocket pod is jettisoned.

According to the present invention, a very dependable, lightweight closure is provided in the form of an inflatable member or bag that can be inflated to prevent fluid flow into or through an opening, and which can be deflated to permit fluid flow. Such an arrangement has obvious application in the intake duct of the jet engines of a jet engine aircraft, or in the front of a rocket pod so that streamlining thereof can be achieved for flight to and from a target. According to this invention, the inflatable member is disposed in the opening to be controlled, and is operable in such a manner as to close off said opening upon being inflated, and to allow free flow therethrough when deflated. The inflating means may be any convenient source of low pressure fluid, such as from the compressor of one of the jet engines of a jet engine aircraft. For deflation, any of a number of small vacuum sources may be utilized.

The deployment of the deflatable member or bag from the stowed position to the inflated position or vice versa involves no moving mechanical parts prone to fail or to get out of alignment, and by the utilization of comparatively low pressure air, the bag may be inflated into the preestablished streamlined contour.

Although reinforcement members for the bag are not needed for low speed or low pressure operations, it may be desirable for certain applications to provide some reinforcement for the walls of the inflatable member, so that when inflated, such will assume a precise contour despite the flow of fluid thereover. To that end, according to one embodiment of this invention a plurality of contoured members are arranged in spaced relationship about the opening to be selectively opened or closed, with the members each being of generally arcuate configuration and together defining a preselected streamlined shape. Therefore, upon inflation means being operated to bring about inflation of the inflatable member, the contoured members insure the bringing about of the desired streamlined contour of the inflatable member so as to insure the desired free flow of fluid medium over the housing in which the opening appears. The plurality of contoured members may be fixed, or may have hinged connections at one end thereof and pivot thereabout as the inflated member is inflated or deflated, thereby providing support for the walls of the inflated member at all times.

As will be apparent to those skilled in the art, the present invention possesses the ability of being "reversible" or "repeatable" inasmuch as the inflation or deflation of the member may occur during flight as often as required, such as in the event of ancillary jet engines used only for takeoff, or in the case of engines that have failed in flight. In conjunction with such uses, the inflatable member is to be selectively inflated to prevent undesired flow of air through a stopped engine, and to minimize drag. Similarly, when used in rocket pod applications, by virtue of this feature of selectivity, the rocket pod need lose its streamlined forward configuration only during actual firing of the rockets therefrom. Other uses and applications for this invention should also be apparent, such as for use with pods on blimps or helicopters, or other comparatively low speed devices, in which event neither internal or external stays nor contoured members may be required, for the natural strength of the inflated material may be sufficient to maintain the necessary rigidity. Other uses may include use with devices in which the fluid is water and not air, such as for the sealing of certain ports or openings aboard a marine vessel in a selective manner, so that when inflated, the bag forms a desired contour.

Figure 5:
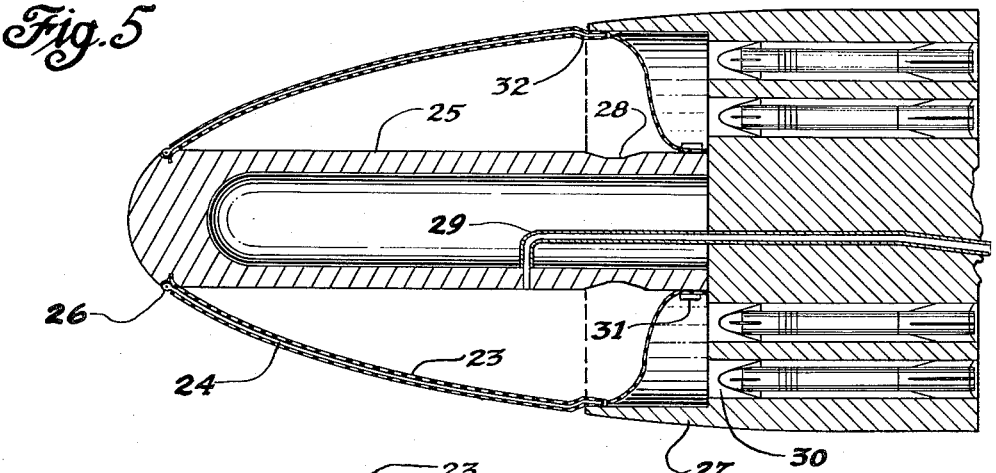
Figure 6:
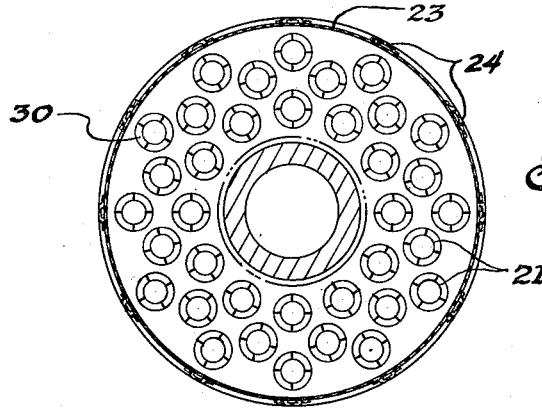

Turning now to the figures of drawings:
FIGURE 1 is a side elevation view of a typical aircraft engine inlet, with certain portions removed to facilitate the illustration of the flow of air thereinto;
FIGURE 2 is a view taken along lines 2—2 in FIGURE 1 but with the inflatable bag in its inflated position to block the flow of air into the engine inlet;
FIGURE 3 is a cross-sectional view taken along the lines 3—3 in FIGURE 1 to reveal how the inflated bag is caused by retaining wires or struts to assume a desired contour;
FIGURE 4 is a side-elevational view of a second embodiment of this invention, wherein an inflatable closure for a rocket pod can be deflated at the time of the firing of rockets from the pod;
FIGURE 5 is a view along lines 5—5 in FIGURE 4 but with portions broken away to reveal internal construction and the bag in an inflated position; and
FIGURE 6 is a view taken looking into the inlet of a rocket pod.

Referring first to FIGURE 1, there is revealed an embodiment of this invention useable in conjunction with the inlet portion of a typical aircraft nacelle or external pod 10, with the short dark arrows indicating the flow of air into an air breathing engine, such as a turbojet engine. Inflatable bag 11 is disposed on substantially the center line of the nacelle or pod, and is arranged to lie closely around the centrally disposed structural member 12 when the bag is in the deflated position shown. Inflatable member 11 must be flexible enough to be capable of being inflated from the position shown in FIGURE 1 into the position shown in FIGURE 2, and when inflated into the position shown in latter figure, it prevents the entrance of air into the engine inlet 18, with the air flowing smoothly around the inflated bag as shown by the series of arrows in FIGURE 2. Bag 11, for example, may be made of commercially available plastics, or rubber-like materials such as reinforced neoprene, Buna rubbers, or the like, with tire cord or even nylon serving to reinforce the material. Silicone products may be used under certain high temperature conditions.

As best shown in FIGURES 1 and 3, a plurality of contoured members such as spaced wires or struts 13 are disposed about the engine inlet in such a manner as to define a preselected streamlined shape. Therefore, upon bag 11 being inflated, its external contour will be defined by the arcuately configured members 13, thereby assuring, for example, in the case of the failure of one engine of a multi-engine aircraft, that the nacelle of the shut-down engine will be closed to prevent the flow of air thereinto, and that the nacelle or pod will represent a streamlined contour for the smooth flow of air thereover, giving low drag.

The forward ends of members 13 are secured about the forwardmost portion 14 of center structural member 12, whereas the rearward portion of these members are secured about the engine inlet member 15. The aft end of the bag is secured about member 12 such as by encircling band 16, whereas the forward edge of bag 11 is secured about member 12 in the vicinity of portion 14, such as by a similar band, not shown. An inflated tube or conduit 17 is provided in center member 12 to apply compressed air or the like into the space between member 12 and bag 11, to bring about controlled inflation of the bag. It should be noted that a large inflation pressure is not required, and a pressure of, for example, 20 lbs./sq. in. should be sufficient to maintain the contour desired and the closure of the engine inlet at sea level speeds up to Mach 1, and when at an altitude of 35,000 feet, at speeds up to Mach 3. As should be obvious, the compressor of another turbojet engine of the aircraft is quite sufficient to supply compressed air for inflation purposes. Bag 11, when fully inflated, tends to bulge slightly in the spaces between struts 13.

In very high speed flight or other conditions where high temperatures will be generated at the stagnation point of the fluid flow occurring at or near point 14, the central structural member 12 will serve as a heat sink. If necessary, cooling fluid may be pumped through member 12 to increase its ability to carry away heat. In other extreme temperature conditions the inflatable member 11 itself may be double walled with cooling fluid pumped between the walls to carry away heat.

Turning now to the second embodiment of this invention, in FIGURE 4 a rocket 21 is shown leaving a rocket pod 22, with bag 23 disposed in the collapsed position so as to avoid any interference with the firing of rickets from the pod. Although the embodiment according to FIGURE 1 could be employed in a rocket pod configuration if the members 13 are suitably spaced, in the embodiment according to this figure any interference problems are avoided by utilizing stays or contoured members 24 that are secured to or contained in bag 23. Stays 24 are suitably secured in hinged relation about the forward part of center member 25, such as by hinges 26, so as to be freely movable between the deployed position shown in FIGURE 5, and the folded position shown in FIGURE 4, as the bag is inflated or deflated, respectively. The ends 32 of stays 24 opposite hinges 26 are somewhat of a hook configuration and are arranged to rest against the inner surface of the lip 27 of the rocket pod upon the bag being inflated, thereby to prevent undue stress to be placed upon the walls of bag 23. Suitable recesses 28 are provided about the center member 25 into which end portions 32 of stays 24 may rest when the bag is in the deflated position. As in the previous embodiment, conduit 29 is arranged to conduct compressed air into the space between center member 25 and bag 23 so as to bring about for inflation of the latter. A suitable ring 31 is utilized for securing the rearward edge of bag 23 to the center member.

As will be obvious, the bag used in either embodiment can be of pleated material in which longitudinal folds are present when the bag is in the deflated position, or alternatively, an expandable material may be used in the construction of the bag so that the bag is actually stretched from the deflated position, into the inflated position filling the opening with which it is used. Deflation may be brought about by the application of a vacuum from a suitable source, or by the use in the embodiment according to FIGURES 4 through 6 of a number of small springs associated with hinges 26 to return the bag to the collapsed position.

A number of uses for each of the embodiment of this invention will be apparent, for the second embodiment may be used in conjunction with the engine configuration, and the first embodiment, as previously mentioned, can be used with the rocket pod. By the use of this invention, a turbojet engine may be shut down in flight, but in addition, the inflatable bag may be used to close off the inlet to the engine when the aircraft is on the ground, thereby preventing the inhalation of foreign objects into the engine inlet.

This invention is of broad enough scope to permit its use with any of a number of uses, and should not be restricted except to the extent required by the following claims.

I claim:

1. A closure arrangement for a vehicle adapted to travel in a fluid medium, comprising a housing defining therein a generally circular opening, a structural member located in said opening, an inflatable member disposed upon said structural member, and being so located with respect to said housing as to substantially fill and close off said opening upon being inflated, means to inflate said member, and a plurality of contoured members arranged in spaced relationship about and supported by said structural member, said spaced contoured members defining a preselected streamlined shape and allowing fluid to flow therebetween and therefore enter said opening when said inflatable member is deflated, whereby upon said means being operated to bring about inflation of said inflatable member, said contoured members insure a desired streamlined contour of said inflatable member so as to bring about the desired free flow of fluid medium over said housing.

2. The arrangement as defined in claim 1 in which said plurality of contoured members, extend between said structural member and said housing.

3. A streamlined closure arrangement for a vehicle adapted to travel in a fluid medium comprising a housing defining therein a generally circular, forwardly-directed opening, a structural member located in said opening and extending forwardly of said housing, an inflatable member disposed about the circumference of said structural member and selectively operable to close off said opening, a plurality of contoured members arranged in spaced relationship about said structural member, between which contoured members fluid can flow so as to enter said opening, one end of each contoured member being secured to said structural member, and the other end secured to said housing about said opening, said contoured members collectively defining a streamlined configuration to which said inflatable member must substantially conform upon being inflated to close off said opening, and means for controlling the inflation of said inflatable member, whereby upon the latter means being operated to bring about inflation of said inflatable member, said contoured members insure a streamlined contour of said inflatable member, so as to bring about the desired free flow of fluid medium over said housing.

4. A streamlined closure arrangement for a vehicle adapted to travel in a fluid medium, comprising a housing defining therein a generally circular opening into which fluid medium may on occasion enter, a structural member located in said opening, a generally toroidally shaped inflatable member disposed upon said structural member, and being so located with respect to said housing as to substantially fill and close off said opening upon being inflated, means to inflate said member, and a plurality of contoured members supported in spaced relationship about said structural member, and extending therefrom to said housing, said spaced contoured members defining a preselected streamlined shape and allowing fluid to flow therebetween, whereas upon said means being operated to bring about inflation of said inflatable member, said contoured members insure a desired streamlined contour of said inflatable member so as to bring about the desired free flow of fluid medium over said housing.

References Cited in the file of this patent

UNITED STATES PATENTS

| | | |
|---|---|---|
| 2,247,363 | Dunn | July 1, 1941 |
| 2,696,078 | Waitzman | Dec. 7, 1954 |
| 2,698,711 | Newcomb | Jan. 4, 1955 |
| 2,724,405 | Stover | Nov. 22, 1955 |
| 2,737,019 | Billman | Mar. 6, 1956 |
| 2,763,426 | Erwin | Sept. 18, 1956 |
| 2,826,961 | White | Mar. 18, 1958 |
| 2,848,181 | Landers | Aug. 19, 1958 |

FOREIGN PATENTS

| | | |
|---|---|---|
| 1,148,395 | France | June 17, 1957 |
| 800,380 | Great Britain | Aug. 27, 1958 |

OTHER REFERENCES

Germany (Application 1,025,215 printed Feb. 27, 1958).